United States Patent
Zhang et al.

(10) Patent No.: US 9,319,893 B2
(45) Date of Patent: *Apr. 19, 2016

(54) FACILITATING NOISE ESTIMATION IN WIRELESS COMMUNICATION

(71) Applicant: QUALCOMM Incorporated, San Diego, CA (US)

(72) Inventors: Xiaoxia Zhang, San Diego, CA (US); Darshan Jetly, San Diego, CA (US); Hao Xu, San Diego, CA (US); Robert Fuchs, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 100 days.

This patent is subject to a terminal disclaimer.

(21) Appl. No.: 13/746,134

(22) Filed: Jan. 21, 2013

(65) Prior Publication Data

US 2013/0136023 A1 May 30, 2013

Related U.S. Application Data

(63) Continuation of application No. 12/834,554, filed on Jul. 12, 2010, now Pat. No. 8,929,324.

(60) Provisional application No. 61/226,149, filed on Jul. 16, 2009.

(51) Int. Cl.
*H04W 72/04* (2009.01)
*H04W 24/00* (2009.01)
(Continued)

(52) U.S. Cl.
CPC ........... *H04W 24/00* (2013.01); *H04J 13/0062* (2013.01); *H04L 25/0206* (2013.01);
(Continued)

(58) Field of Classification Search
CPC ............. H04J 13/0062; H04L 25/0206; H04L 25/0228; H04L 5/0007; H04W 24/00; H04W 24/10; H04W 28/04; H04W 72/00; H04W 74/0833

USPC .......................................................... 370/330
See application file for complete search history.

(56) References Cited

U.S. PATENT DOCUMENTS 8,412,227 B2 4/2013 Edge et al.
2005/0002324 A1 1/2005 Sutivong et al.
(Continued)

FOREIGN PATENT DOCUMENTS

CN 101409584 A 4/2009
JP H0738496 A 2/1995
(Continued)

OTHER PUBLICATIONS

International Search Report and Written Opinion—PCT/US2010/042120—International Search Authority, European Patent Office, Jan. 24, 2011.
(Continued)

*Primary Examiner* — Luat Phung
(74) *Attorney, Agent, or Firm* — Dalei Dong

(57) ABSTRACT

Providing for noise estimation in wireless communication, and particularly for access request signals transmitted by a user equipment (UE), is described herein. By way of example, a wireless signal receiver can employ unused signal dimensions of a wireless network for noise estimation. In addition, the unused signal dimensions can be selected for time-frequency resources that are associated with a particular wireless channel, in order to obtain a noise estimate for that channel. By employing unused signal dimensions, a noise measurement is likely to include no other signal transmissions, and provide an accurate estimate of noise on that channel. According to various aspects of the subject disclosure, one or more Chu sequences employed for signal transmissions, root sequences thereof, or one or more cyclic shifts of a root sequence can be employed for the unused signal dimension.

29 Claims, 11 Drawing Sheets

(51) Int. Cl.
  *H04J 13/00* (2011.01)
  *H04L 25/02* (2006.01)
  *H04W 24/10* (2009.01)
  *H04L 5/00* (2006.01)
  *H04W 28/04* (2009.01)
  *H04W 72/00* (2009.01)
  *H04W 74/08* (2009.01)

(52) U.S. Cl.
  CPC ........... *H04L25/0228* (2013.01); *H04W 24/10* (2013.01); *H04L 5/0007* (2013.01); *H04W 28/04* (2013.01); *H04W 72/00* (2013.01); *H04W 74/0833* (2013.01)

(56) References Cited

U.S. PATENT DOCUMENTS

| | | | |
|---|---|---|---|
| 2007/0183522 A1 | 8/2007 | Garrett et al. | |
| 2010/0111141 A1 | 5/2010 | Currivan et al. | |
| 2010/0255867 A1* | 10/2010 | Ishii et al. | 455/501 |
| 2011/0188466 A1 | 8/2011 | Zhang et al. | |
| 2011/0261752 A1* | 10/2011 | Fischer et al. | 370/328 |
| 2011/0286473 A1 | 11/2011 | Currivan et al. | |

FOREIGN PATENT DOCUMENTS

| | | |
|---|---|---|
| JP | 2000252879 A | 9/2000 |
| JP | 2003510889 A | 3/2003 |
| JP | 2004193670 A | 7/2004 |
| JP | 2006500870 A | 1/2006 |
| JP | 2008236427 A | 10/2008 |
| JP | 2008283514 A | 11/2008 |
| JP | 2012523748 A | 10/2012 |
| WO | WO-2008155903 A1 | 12/2008 |
| WO | 2009047732 A2 | 4/2009 |
| WO | 2009057483 A1 | 5/2009 |
| WO | WO 2009057483 A1 * | 5/2009 |
| WO | 2009078785 A1 | 6/2009 |
| WO | WO-2009079103 | 6/2009 |

OTHER PUBLICATIONS

Taiwan Search Report—TW099123310—TIPO—Apr. 21, 2013.

* cited by examiner

FACILITATING NOISE ESTIMATION IN WIRELESS COMMUNICATION

CLAIM OF PRIORITY UNDER 35 U.S.C. §119 AND §120

The present Application is a continuation application of U.S. patent application Ser. No. 12/834,554, filed Jul. 12, 2010, entitled FACILITATING NOISE ESTIMATION IN WIRELESS COMMUNICATION which claims the benefit to U.S. Provisional Patent Application No. 61/226,149, filed Jul. 16, 2009, entitled METHOD AND APPARATUS FACILITATING NOISE ESTIMATION, assigned to the assignee hereof, and hereby expressly incorporated by reference herein by their entireties.

BACKGROUND

I. Field

The present aspects relate to wireless communication, and more particularly, to techniques for noise estimation, such as, but not limited to, physical random access channel (PRACH) noise estimation.

II. Background

Wireless communication systems are widely deployed to provide various types of communication content, such as voice content, data content, and so on. Typical wireless communication systems can be multiple-access systems capable of supporting communication with multiple users by sharing available system resources (e.g., bandwidth, transmit power, etc.). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP2, High Speed Packet Access (HSPA), High Speed Downlink Packet Access (HSDPA), High Speed Uplink Packet Access (HSUPA), 3GPP long-term evolution (LTE), LTE Advanced (LTE-A), etc.

Generally, wireless multiple-access communication systems can simultaneously support communication for multiple mobile devices. Each mobile device can communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations can be established via single-input single-output (SISO) systems, multiple-input single-output (MISO) systems, multiple-input multiple-output (MIMO) systems, and so forth.

To effect wireless communications, a user equipment requests access to enter a wireless network by transmitting a wireless signal on an access channel of the wireless network. The wireless signal is received by a base station and analyzed to determine whether to grant the user equipment access to the wireless network (e.g., if the user equipment is associated with a valid subscription to the wireless network). In order to successfully receive and demodulate a received signal, the base station must separate the received signal from other transmitted signals and compare received signal strength to noise on the access channel, among other things. However, noise estimation can be difficult where the signal strength is relatively weak compared to the noise, where interference from other transmitters exists, or where other physical conditions such as signal scattering, high Doppler effects, or the like, are prevalent on the access channel. Accordingly, mechanisms for accurately estimating and removing noise are beneficial to successful wireless communication.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects of the subject disclosure in a simplified form as a prelude to the more detailed description that is presented later.

The subject disclosure provides for noise estimation in wireless communication, and particularly for access request signals transmitted by user equipment (a UE). In some aspects of the subject disclosure, a receiver can employ unused signal dimensions for noise estimation. In addition, the unused signal dimensions can be selected for time-frequency resources that are associated with a particular wireless channel, in order to obtain a noise estimate for that channel. By employing unused signal dimensions, a noise measurement is likely to include no other signal transmissions, and provide an accurate estimate of noise on that channel.

According to particular aspects of the subject disclosure, various types of unused signal dimensions can be employed for channel noise estimation. For instance, one or more unused cyclic shifts of a Zadoff-Chu sequence (referred to herein as a Chu sequence) can be employed as the unused signal dimension. In another instance, a subset of Chu sequences can be reserved for noise estimation, either by a hardware signal processor that generates energy correlations for different cyclic shifts of these sequences, or a software processing module that employs an energy correlation output of the hardware signal processor. In yet another instance, one or more roots of a Chu sequence(s) can be reserved for noise estimation instead. According to at least one aspect, a root sequence can be selected that is not otherwise utilized by a receiving base station, or by neighboring base stations within a signaling range of the receiving base station. Depending on a number of unused signal dimensions employed for noise estimation, or whether estimation is performed at the hardware signal processor or the software processing module, an average of multiple estimates can be performed across multiple cyclic shifts to increase overall accuracy of the noise estimate.

In other aspects of the subject disclosure, provided is a method for wireless communication. The method can comprise identifying a set of time-frequency resources for a random access probe according to a wireless network protocol. Additionally, the method can comprise identifying at least one unused dimension that is orthogonal or pseudo-orthogonal to permitted random access probe dimensions. Further to the above, the method can comprise estimating noise for the random access probe based on analysis of the at least one unused dimension.

In an additional aspect, provided is an apparatus configured for wireless communication. The apparatus can comprise a communication interface for receiving an uplink wireless signal. The apparatus can also comprise a memory for storing instructions configured to measure noise for the uplink wireless signal and a data processor for executing modules that implement the instructions. At least one of the modules can comprise a reference module that identifies a set of unused signal dimensions for a geographic region in which the apparatus supports wireless network service, wherein the set of unused signal dimensions are time-based or frequency-based signal dimensions. Moreover, the modules can also comprise a calculation module that measures received energy on the set of unused signal dimensions and computes an estimate of noise for the uplink wireless signal.

In still other aspects, disclosed is an apparatus for wireless communication. The apparatus can comprise means for identifying time-frequency resources provided for uplink random access requests according to a wireless network protocol. Further, the apparatus can comprise means for identifying signal dimensions that are orthogonal or pseudo-orthogonal to permitted random access dimensions on the time-frequency resources, and that are not assigned for uplink transmission on the time-frequency resources in a geographic region served by the apparatus. Further still, the apparatus can comprise means for estimating noise on the time-frequency resources based on analysis of the signal dimensions.

According to another aspect, provided is at least one processor configured for wireless communication. The processor(s) can comprise a first module that identifies time-frequency resources provided for uplink random access requests according to a wireless network protocol. In addition, the processor(s) can comprise a second module that identifies signal dimensions that are orthogonal or pseudo-orthogonal to permitted random access dimensions on the time-frequency resources, and that are not assigned for uplink transmission on the time-frequency resources in a geographic region served by a base station. Furthermore, the processor(s) can comprise a third module that estimates noise on the time-frequency resources based on analysis of the signal dimensions.

Still other aspects of the subject disclosure provide a computer program product comprising a computer-readable medium. The computer-readable medium can comprise a first set of codes for causing a computer to identify time-frequency resources provided for uplink random access requests according to a wireless network protocol. Further, the computer-readable medium can comprise a second set of codes for causing the computer to identify signal dimensions that are orthogonal or pseudo-orthogonal to permitted random access dimensions on the time-frequency resources, and that are not assigned for uplink transmission on the time-frequency resources in a geographic region served by a base station. Further still, the computer-readable medium can comprise a third set of codes for causing the computer to estimate noise on the time-frequency resources based on analysis of the signal dimensions.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
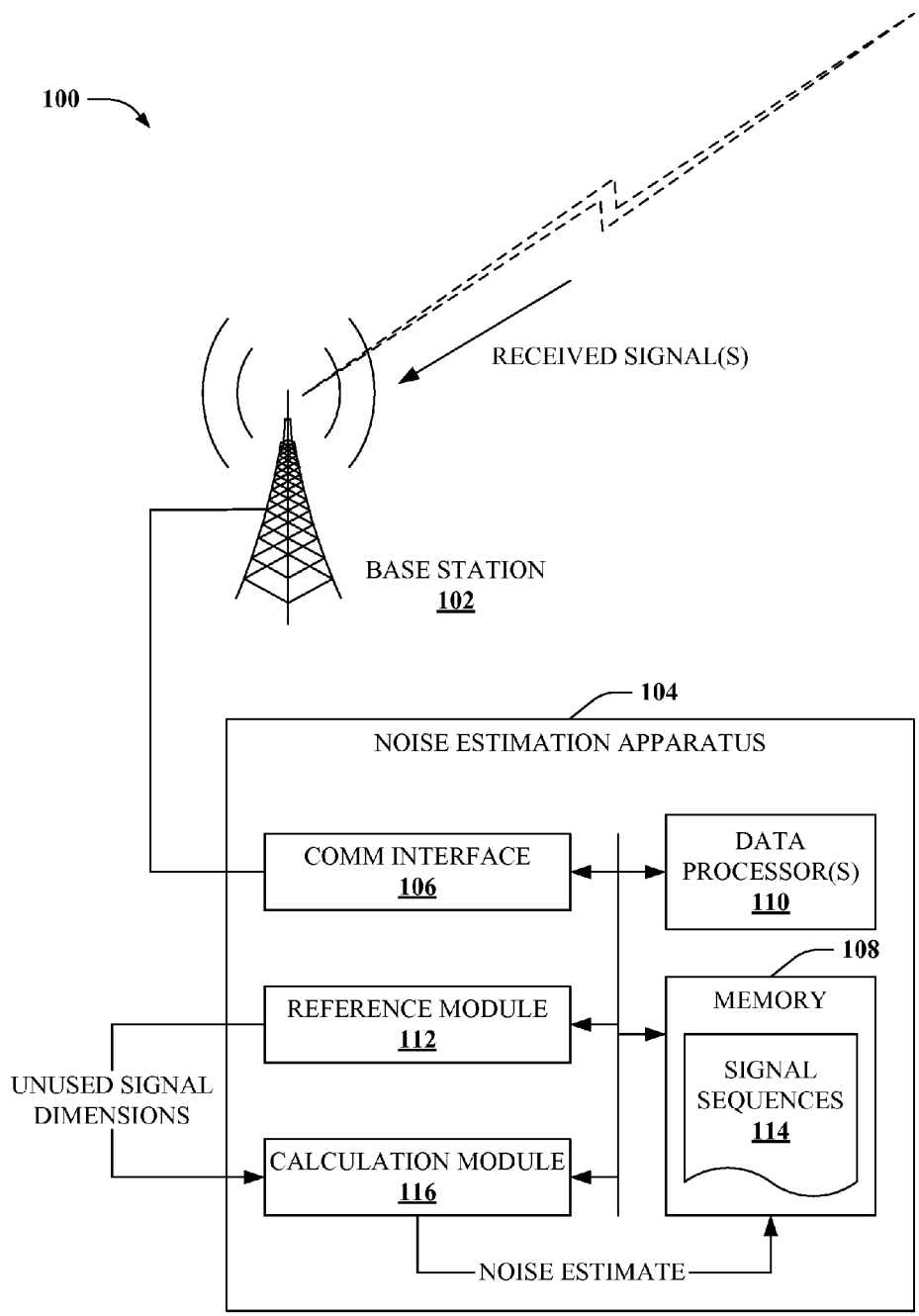
FIG. 1 illustrates a block diagram of an example wireless apparatus that provides noise estimation for received wireless signals according to disclosed aspects.

Various aspects are now described with reference to the drawings, wherein like reference numerals are used to refer to like elements throughout. In the following description, for purposes of explanation, numerous specific details are set forth in order to provide a thorough understanding of one or more aspects. It can be evident, however, that such aspect(s) can be practiced without these specific details. In other instances, well-known structures and devices are shown in block diagram form in order to facilitate describing one or more aspects.

In addition, various aspects of the disclosure are described below. It should be apparent that the teaching herein can be embodied in a wide variety of forms and that any specific structure and/or function disclosed herein is merely representative. Based on the teachings herein one skilled in the art should appreciate that an aspect disclosed herein can be implemented independently of any other aspects and that two or more of these aspects can be combined in various ways. For example, an apparatus can be implemented and/or a method practiced using any number of the aspects set forth herein. In addition, an apparatus can be implemented and/or a method practiced using other structure and/or functionality in addition to or other than one or more of the aspects set forth herein. As an example, many of the methods, devices, systems and apparatuses described herein are described in the context of providing improved noise estimation for wireless communication, among other things. One skilled in the art should appreciate that similar techniques could apply to other communication environments.

Wireless communication systems achieve electronic communication between remotely located wireless nodes through local infrastructure deployments (e.g., comprising a network of base stations) and central networks that communicatively couple local infrastructure. The central networks are configured to determine location of a mobile user equipment (UE) to deliver content to the UE, and in the aggregate form an overall communication link between the local infrastructure serving individual mobile devices and remote nodes engaged in the electronic communication. In general, the local infrastructure can utilize various wireless communication technologies to exchange wireless information with these nodes, including code division multiplex (CDM), frequency division multiplex (FDM), orthogonal frequency division multiplex (OFDM), time division duplex (TDD), and so on, utilizing various single or multiple carrier frequencies, or mixed single and multiple carrier frequencies. Furthermore, the infrastructure may include 3GPP LTE or LTE-A wireless networks, WCDMA wireless networks, OFDMA wireless networks, CDMA networks, 3GPP2 CDMA2000 networks, EV-DO networks, WiMAX networks, HSPA networks, etc.

In order to access a wireless network, a UE sends, transmits or otherwise communicates an access probe signal to a base station of the wireless network. Generally, the access probe signal is transmitted on particular wireless resources (e.g., time-frequency resources) reserved by the wireless network for access signals (these wireless resources can be referred to as access resources, or an access channel, e.g., a physical random access channel (PRACH)). Access channel resources are generally broadcast by the base station to a cell, or geographic region, served by the base station. This broadcast can comprise a system information block (a SIB) broadcast, or the like. A device configured to receive the broadcast and transmit a suitable access probe on the access channel resources can attempt to access the wireless network.

Access probes are generally referred to as blind access signals, or random access signals, because the base station is typically not aware of whether it will receive an access probe signal on an access resource or how many access probe signals it will receive. The base station may determine that a remote device (the UE) is attempting to access the wireless network by measuring received energy levels on the access resource, and comparing the received energy levels to a predetermined threshold. For instance, the base station can receive a set of signals on the access resource, and determine that signals having an energy level above the predetermined threshold are access probe signals, and signals having an energy level below the predetermined threshold are noise. Since the base station does not have prior knowledge of whether or how many UEs are attempting to access the wireless network on an access channel, the base station may attribute all received signals to noise, if energy levels of those signals do not exceed the predetermined threshold. Therefore, the base station will not respond to an access probe that is not strong enough to be attributed as a valid signal.

It can be appreciated that if the predetermined threshold is set too low, then a base station may respond in a case where no UE is attempting to access the wireless network. As a consequence, the base station can make inefficient use of network resources, and unnecessarily interfere with other signals of nearby base stations. Additionally or alternatively, if the predetermined threshold is set too high, then the base station can ignore valid access requests, resulting in poor wireless service. In theory, the predetermined threshold should be a function of actual noise levels affecting an access channel at a given time. However, the actual noise is typically unknown and is estimated instead. Accordingly, accurate noise estimation for a PRACH or other channel is helpful for determining a false alarm threshold (a FA threshold) employed to reject or respond to potential access requests. Described herein are various techniques for noise estimation, including PRACH noise estimation, in accordance with aspects of the subject disclosure.

Referring now to the figures, FIG. 1 depicts a block diagram of an example wireless communication apparatus 100 according to aspects of the subject disclosure. Wireless communication apparatus 100 can be employed for receiving and responding to random access requests of UEs attempting to access a wireless network. In addition, wireless communication apparatus 100 can provide noise estimation to differentiate valid access requests from background noise on an access channel, such as a PRACH.

One mechanism that wireless networks utilize to orthogonalize or pseudo-orthogonalize wireless signals is to employ Chu sequences. A Chu sequence is a complex-valued mathematical sequence which can be applied to a radio signal and results in a substantially constant amplitude signal. Further, cyclic shifted versions of the Chu sequence and the radio signal are pseudo-orthogonal when received by a receiver. A generated Chu sequence that is not shifted is a root sequence. As described herein, various subsets of a set of Chu sequences, including one or more sequences, one or more root sequences, or one or more cyclic shifts can be employed for noise estimation by wireless communication apparatus 100 on an access channel.

Wireless communication apparatus 100 can comprise a base station 102 of a wireless network, communicatively coupled with a noise estimation apparatus 104. It should be appreciated that base station 102 can be an access point of a wireless network, such as a 3GPP LTE network, or other frequency division multiple access network (an FDMA network), or a similar network. Further, base station 102 can employ single or multiple carrier frequencies on an uplink or a downlink.

In 3GPP LTE, for example, a PRACH employs Chu sequences due to beneficial correlation properties and zero (or substantially zero) correlation within the same root sequence. Neighboring cells (e.g., within a wireless signal range of base station 102) can employ different root sequences to mitigate inter-cell interference. To filter signals transmitted with Chu sequences, base station 102 receives a signal, and removes a cyclic prefix from an extracted and down-sampled time domain version of the received signal. Signal samples are converted into the frequency domain (optionally with multi-segment processing, where multiple segments comprising multiple time domain samples are generated, to correct for high Doppler conditions, for instance) and matched with Chu sequences generated in the frequency domain. Matched output symbols are converted back to the time domain to obtain energy correlation metrics (also referred to herein as energy metrics) within a root sequence. Generally, a single cyclic cross-correlation is obtained per root sequence (e.g., for low Doppler and small frequency offset conditions), however multiple cyclic cross-correlations can also be obtained per root sequence for multi-segment processing. Energy levels obtained from the cyclic cross-correlation can be employed to estimate the received signal. As is described below, various unused signal dimensions, on which no valid access signals are expected, can be employed to estimate access channel noise independent of transmitted access signals.

Noise estimation apparatus 104 can comprise a communication interface 106 for receiving an uplink wireless signal on an uplink channel (e.g., a PRACH) employed by base station 102. In one aspect of the subject disclosure, communication interface 106 can comprise a transmit-receive chain of base station 102 (e.g., see FIG. 8, infra). In other aspects of the subject disclosure, communication interface 106 can instead comprise an electronic communication interface suitable to communicate with the transmit-receive chain of base station 102 and, for instance, receive the uplink wireless signal from base station 102.

In addition to the foregoing, noise estimation apparatus 104 can comprise a memory 108 for storing instructions configured to estimate noise for uplink wireless signal transmissions and a data processor 110 for executing modules that implement the instructions. These modules can include, for instance, a reference module that identifies a set of unused signal dimensions for the uplink channel. In addition to the foregoing, noise estimation apparatus 104 can comprise a calculation module 116 that measures received energy on the set of unused signal dimensions and computes an estimate of noise for the uplink wireless signal.

Unused signal dimensions can be identified by reference module 112 for the noise estimation according to various suitable network protocols. For instance, the unused signal dimensions can be extracted from a set of signal sequences 114 stored in memory 108, based on a protocol (not depicted—but which also can be stored in memory 108) that assigns signal dimensions to channels employed by base station 102. Particularly, signal dimensions that are not assigned by the protocol can be employed by reference module 112. In one instance, the set of unused signal dimensions can comprise a set of code sequences that are not employed for transmission at least of uplink signals in a geographic region served by noise estimation apparatus 104 and base station 102. As an example, the code sequences can be a subset of Chu sequences, or one or more root sequences, that are not employed for providing orthogonality or pseudo-orthogonality at least for the uplink signals. In another instance, the set of unused signal dimensions can comprise unused cyclic shifts of a set of Chu sequences that are in part employed by base station 102. As still another example, the set of unused signal dimensions can comprise a set of cyclic shifts of a root sequence that is not employed for generating uplink signal transmissions in the geographic area, or within a signal range of base station 102. In this latter case, reference module 112 identifies the set of unused signal dimensions from cyclic shifts of the unused root sequence, and calculation module 116 obtains a set of energy metrics per cyclic shift of the unused root sequence and averages the set of energy metrics to compute the estimate of noise.

Figure 2:
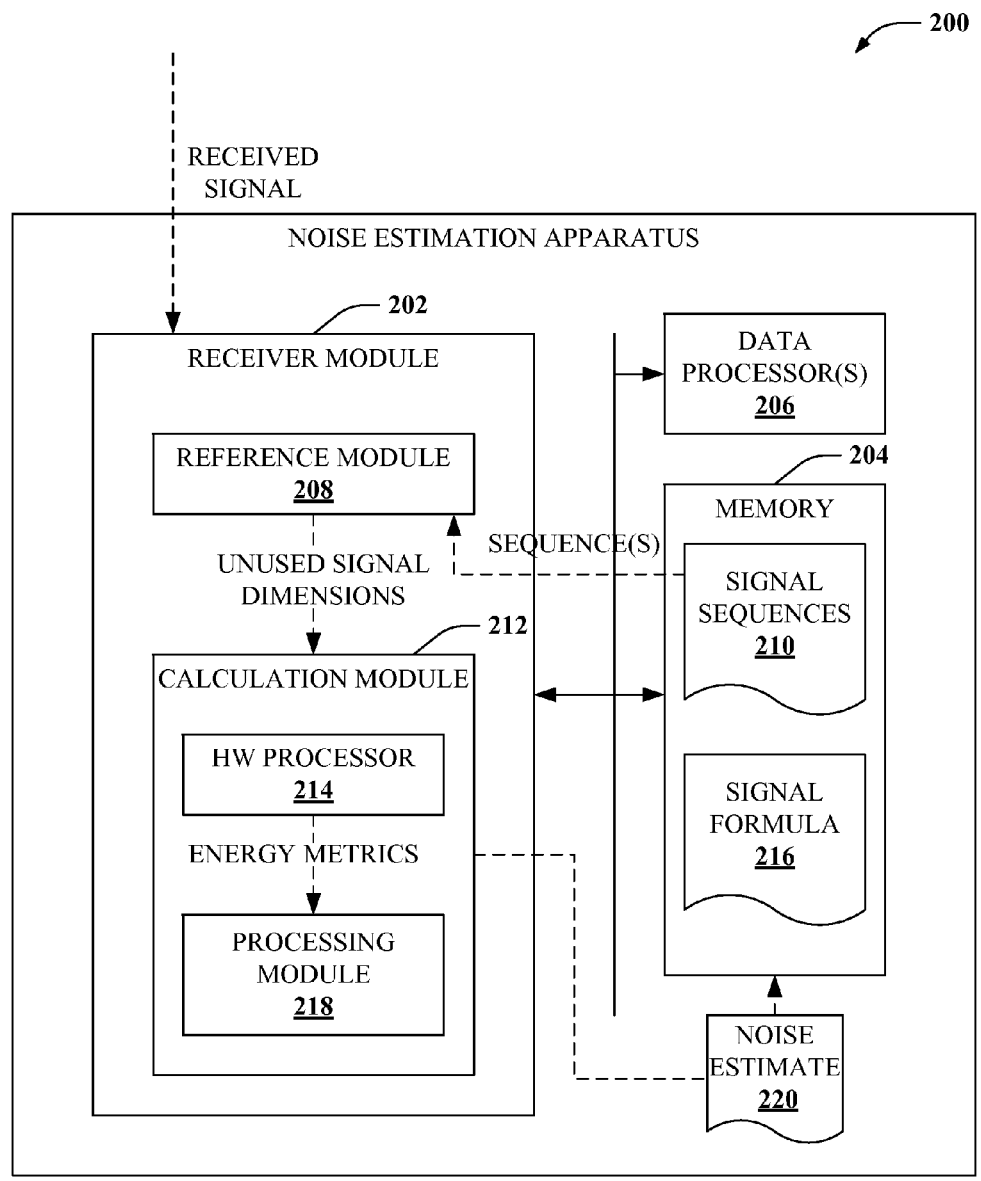
FIG. 2 illustrates a block diagram of a sample noise estimation apparatus according to particular aspects of the subject disclosure.

FIG. 2 illustrates a block diagram of an example noise estimation apparatus 200 according to further aspects of the subject disclosure. In at least some aspects of the subject disclosure, noise estimation apparatus 200 can be substantially similar to noise estimation apparatus 104 of FIG. 1, supra. However, the subject disclosure is not so limited. As is described herein and below, noise estimation apparatus 200 can comprise some or all of the features of noise estimation apparatus 104, as well as additional features.

Noise estimation apparatus 200 can comprise a receiver module 202 configured to receive wireless signals. Particularly, receiver module 202 can be configured to identify access channel resources associated with a PRACH (e.g., time-frequency resources designated for random access probe signals) of a wireless network, and receive and down-sample signal energy observed on the PRACH. Additionally, noise estimation apparatus 200 can comprise memory 204 for storing instructions or protocols configured to estimate noise on the PRACH, and a data processor 206 that executes one or more modules of noise estimation apparatus 200 to implement features thereof. Particularly, a reference module 208 can be executed to identify a set of unused signal dimensions from signal sequences 210 stored in memory 204. These unused signal dimensions can be sequences, root sequences, or cyclic shifts of one or more sequences that are not employed within a region served by noise estimation apparatus 200 or within a signal range of a base station coupled with noise estimation apparatus 200. Because these signal dimensions are unused, noise estimation apparatus 200 can assume that observed energy according to these signal dimensions on the PRACH are noise.

Once identifies, reference module 208 provides the unused signal dimensions to a calculation module 212. Calculation module 212 comprises a hardware signal processor 214 that measures received energy on the set of unused signal dimensions. The received energy can be employed to estimate noise on the PRACH. In one instance, the estimate of noise can be performed by hardware signal processor 214. In another instance, the estimate of noise can be performed by a processing module 218, which can comprise hardware, software, firmware, or a suitable combination thereof. Noise estimation performed by hardware signal processor 214 can provide improved accuracy of the noise, by averaging multiple energy levels of multiple cyclic shifts. Noise estimation performed by processing module 218 can provide noise estimation with few or no changes to hardware of noise estimation apparatus 200, which can be adapted to existing receiver devices (e.g., of a base station) with few or no hardware changes, and minimal time for reconfiguration.

In one aspect of the subject disclosure, hardware signal processor 214 can be employed to compute the estimate of noise by measuring a metric of received signal energy for a subset of unused signal dimensions of the set of unused signal dimensions provided by reference module 208. As an illustrative example of noise estimation, hardware signal processor 214 generates a dimension metric for each unused signal dimension of the subset of unused signal dimensions. After generating these dimension metrics, hardware signal processor 214 performs a statistical calculation on each dimension metric to derive an aggregated metric of the subset of unused signal dimensions. In at least one particular aspect, the statistical calculation can be an average of the dimension metrics, a mean of the dimension metrics, a mode of the dimension metrics, or the like, or a suitable combination thereof. Once generated, hardware signal processor 214 employs the aggregated metric for the estimate of noise, which can be stored in an estimate of noise file 220 in memory 204. Because hardware signal processor 214 directly observes energy levels for the subset of unused signal dimension, the estimate of noise generated by hardware signal processor 214 can be averaged across multiple signal dimensions, for instance, resulting in a higher accuracy estimate.

In another aspect of the subject disclosure, processing module 218 can be employed to compute the estimate of noise. In one illustrative example of this aspect, processing module 218 employs a signal processing formula 216 stored in memory 204 to compute the estimate of noise. In one instance, this estimate of noise can be based on a highest energy metric output by hardware signal processor 214 from a set of cyclic shift energy metrics (e.g., wherein the unused signal dimensions comprise a set of unused cyclic shifts of a Chu sequence(s) or root sequence(s) that is at least in part employed for signal transmission in a geographic region). In this case, the highest energy metric can be employed directly for the estimate of noise. In yet another instance, this estimate of noise can be computed from an aggregate measurement of the received energy on the set of unused signal dimensions. In this latter case, the set of unused signal dimensions can be derived from a set of Chu sequences or a set of root sequences that are not utilized within the geographic region (or a neighboring region), or a wireless range of a base station associated with noise estimation apparatus 200. Hardware signal processor 214 outputs a set of highest energy metrics, at least one for each sequence of the set of Chu sequences or root sequences, which are received at processing module 218. Signal processing formula 216 then performs an average (or other suitable statistical calculation) of a set of received energy metrics associated with the set of unused signal dimensions. Furthermore, processing module 218 employs the average of the set of received energy metrics for the estimate of noise, which can be saved in the estimate of noise file 220 in memory 204.

Once determined, an estimate of noise can be provided to a base station (not depicted) coupled with noise estimation apparatus 200. This estimate of noise can be utilized to establish a FA threshold for the PRACH. Accordingly, signal energy levels higher than the FA threshold are deemed to be valid access probe requests, and signal energy levels lower than the FA threshold are deemed to be invalid access probe requests, or noise.

Figure 3:
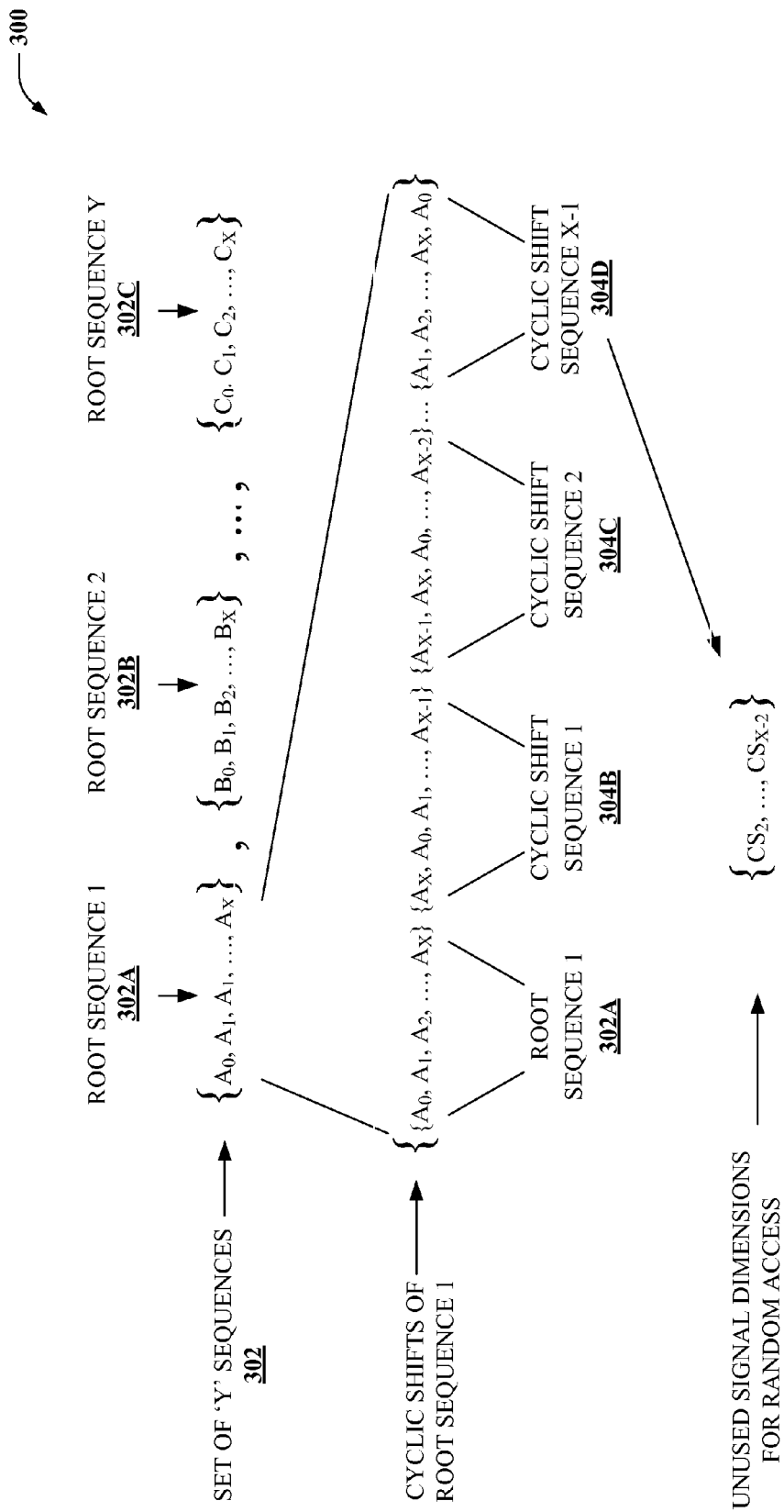
FIG. 3 illustrates a diagram of an example selection of Chu sequences from which unused signal dimensions can be employed for noise estimation.

FIG. 3 illustrates a diagram of code sequences 300 that can be employed at least in part as unused signal dimensions for estimating noise within a cell of a wireless network. Particularly, code sequences 300 can comprise a set of 'Y' Chu sequences, where 'Y' is a positive integer. In at least one aspect of the subject disclosure, Y=64 Chu sequences, although more or fewer Chu sequences can be employed in various aspects of the subject innovation. As depicted, code sequences 300 comprise a set of Y root sequences, comprising root sequence 1 302A, root sequence 2 302B, through root sequence Y 302C (referred to collectively as root sequences 302A-302C). Root sequences 302A-302C are prime sequences that comprise a prime number (e.g., 2, 3, 5, 7, 11, and so on) 'X' of complex-number values $A_{1, 2, \ldots X}$, $B_{1, 2, \ldots X}$, $C_{1, 2, \ldots X}$, respectively. In at least one aspect, X can be 839, although the subject disclosure is not so limited. Further, in another aspect, sequences 302A-302C can comprise different prime numbers of values, e.g., X, N and O, where N and O are different prime numbers than X.

Each root sequence 302A-302C can be cyclically shifted 'X−1' number of times to generate X−1 shifted sequences, plus a root sequence, for a total of X sequences per root sequence 302A, 302B, 302C. Particularly, root sequence 302A comprises root sequence 1 302A, cyclic shift sequence 1 304B, cyclic shift sequence 2 304C, through cyclic shift sequence X−1 304D, for a total of X sequences. Different root sequences 302A-302C and cyclic shifted sequences thereof (e.g., cyclic shifted sequences 304B-304D of root sequence 302A) can be employed for generating pseudo-orthogonal signal dimensions for wireless signals, as described herein. Furthermore, cyclic shifts (e.g., cyclic shift sequence 2 304C) of a root sequence (e.g., root sequence 1 302A) that are not assigned to transmission of signals can be employed as unused signal dimensions 306 for noise estimation as described herein, even if a corresponding root sequence or other cyclic shifts of the root sequence are employed for signal transmissions.

Additionally, in some aspects of the subject disclosure, one or more root sequences can be reserved for noise estimation. In these aspects, the root sequence(s) as well as cyclic shifted variations thereof can be employed for the unused signal dimensions. One advantage of employing a set of root sequences is that conventional receiver hardware can output an energy metric for each root sequence. Where multiple root sequences are reserved for noise estimation, multiple energy metrics (one per root) are output by conventional receiver hardware, enabling an average of these energy metrics per root sequence to be performed in software, providing improved noise estimation with limited changes to conventional receivers. Alternatively, suitably configured receiver hardware can perform an average of energy metrics for each cyclic shift per reserved root sequence, resulting in an average over a wide range of signal dimensions. This suitably configured receiver hardware can therefore provide a highly accurate estimate of noise. According to still other aspects of the subject disclosure, a set of Chu sequences 302 can be reserved for noise estimation, where each root sequence and cyclic shifted sequence of the set of Chu sequences 302 can be employed for energy metric averaging. Table 1 below indicates an example cyclic shift configuration employed for some 3GPP LTE standards, illustrating examples of unused cyclic shift dimensions for various cyclic shift configurations, $N_{CS}$.

TABLE 1

Table: $N_{CS}$ for preamble generation (preamble formats 0-3).

| $N_{CS}$ configuration | Unrestricted set $N_{CS}$ value | Number of Unused shifts |
|---|---|---|
| 0 | 0 | Leave some shifts per sequence (i.e., do not use up all shifts per sequence) |
| 1 | 13 | 7 from the $1^{st}$ root |
| 2 | 15 | 700 from the 2nd root |
| 3 | 18 | 500 from the 2nd root |
| 4 | 22 | 250 from the 2nd root |
| 5 | 26 | 7 from each of the 2 roots (14 in total) |
| 6 | 32 | 450 from the $3^{rd}$ root |
| 7 | 38 | 70 from the $3^{rd}$ root |
| 8 | 46 | 370 from the $4^{th}$ root |
| 9 | 59 | 360 from the $5^{th}$ root |
| 10 | 76 | 150 from the $6^{th}$ root |
| 11 | 93 | 740 from the $8^{th}$ root |
| 12 | 119 | 720 from the $10^{th}$ root |
| 13 | 167 | 170 from the $13^{th}$ root |
| 14 | 279 | 560 from the $22^{nd}$ root |
| 15 | 419 | Leave some shifts per sequence (i.e., do not use up all shifts per sequence) |

Figure 4:
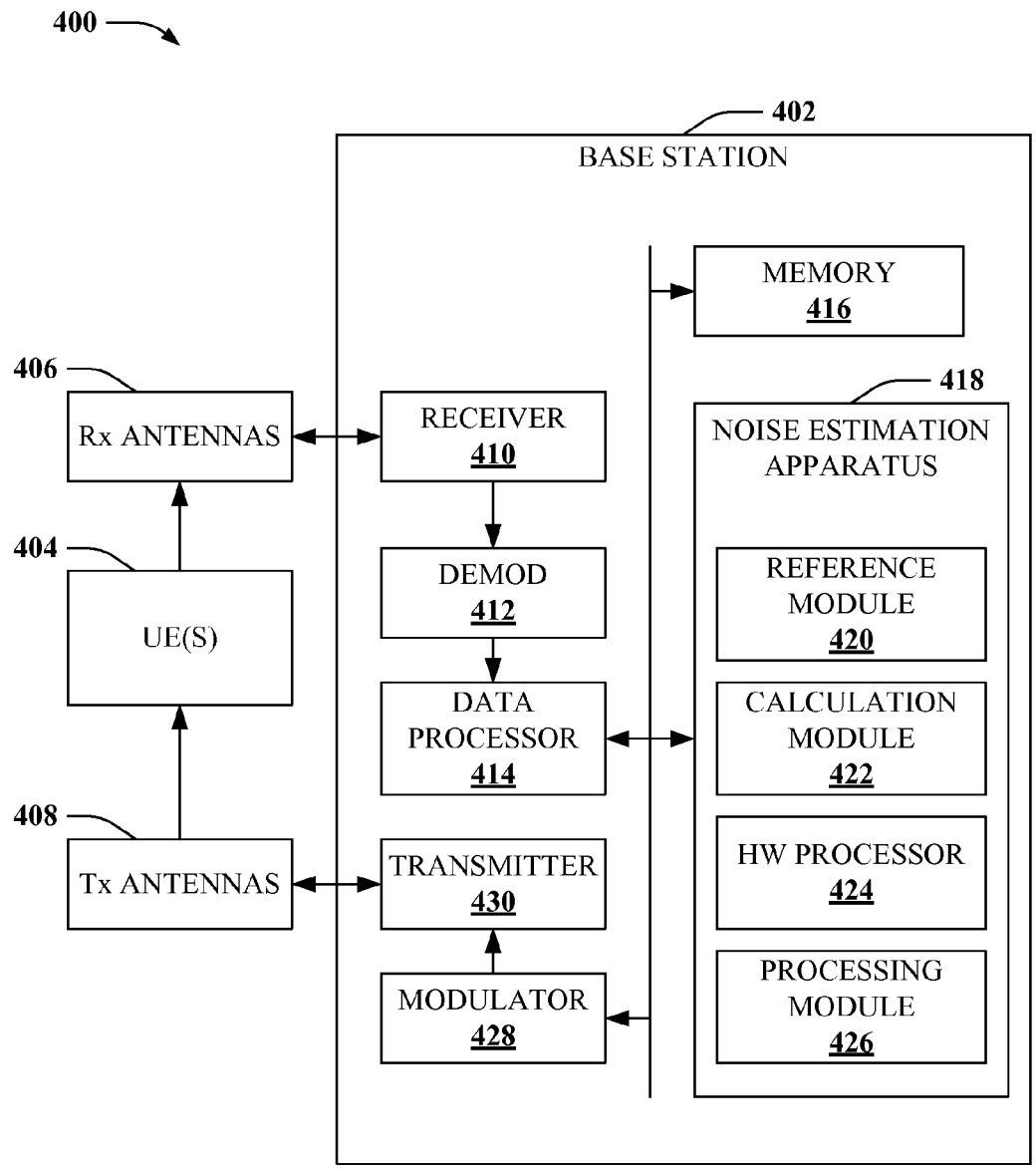
FIG. 4 illustrates a block diagram of a sample base station that provides noise estimation for a physical random access channel (PRACH).

FIG. 4 illustrates a block diagram of an example wireless communication system 400 comprising a base station 402, according to further aspects of the subject disclosure. Base station 402 can be configured to provide cell access for UEs 404 attempting to acquire a wireless network. Particularly, base station 402 can be configured to provide noise estimation for PRACH channels employed by base station 402 for network access requests. The PRACH channels can comprise, for instance, a set of time-frequency resources of the wireless network that are dedicated to, or employed for, random access requests by UE(s) 404. Particularly, the noise estimation can be based on energy metrics on unused signal dimensions associated with the PRACH channels. As is described herein, base station 402 can implement the noise estimation in hardware, software, or a combination thereof, to provide a tradeoff between minimal/cost effective changes to conventional signal receivers and providing high accuracy estimations of the noise.

Base station 402 (e.g., access point, . . . ) can comprise a receiver 410 that obtains wireless signals from UE(s) 404 through one or more receive antennas 406, and a transmitter 430 that sends coded/modulated wireless signals provided by modulator 428 to UE(s) 404 through a transmit antenna(s) 408. Receive antenna(s) 406 and transmit antenna(s) 408, along with receiver 410 and transmitter 430, can comprise a set of wireless transceivers for implementing wireless data exchange with UE(s) 404, as described herein.

Receiver 410 can obtain information from receive antennas 406 and can further comprise a signal recipient (not shown) that receives uplink signals transmitted by UE(s) 404. Additionally, receiver 410 is operatively associated with a demodulator 412 that demodulates received information.

Demodulated symbols are analyzed by a data processor 414. Data processor 414 is coupled to a memory 416 that stores information related to functions provided or implemented by base station 402.

In addition to the foregoing, base station 402 can comprise a noise estimation apparatus 418. According to one or more aspects of the subject disclosure, noise estimation apparatus 418 can be substantially similar to noise estimation apparatus 104 of FIG. 1, or noise estimation apparatus 200 of FIG. 2, or a combination thereof. It should be appreciated that noise estimation apparatus 418 is not limited to these aspects, however. In operation, noise estimation apparatus 418 can comprise a reference module 420 that identifies a set of unused signal dimensions from at least a subset of code sequences employed by base station 402 for signal transmission on a downlink to UE(s) 404, or on an uplink from UE(s) 404. Particularly, the set of unused signal dimensions can comprise a set of Chu sequences, or a set of root sequences of one or more Chu sequences, reserved for noise estimation. Cyclic shifts of this sequence(s)/root sequence(s) can be analyzed by a calculation module 422, which employs energy metrics of time-frequency resources associated with a PRACH employed for UE(s) 404. In one instance, calculation module 422 employs a hardware processor 424 to obtain these energy metrics and compute noise on the PRACH. In another instance, calculation module 422 employs a software processing module 426 to estimate noise from one or more energy metrics output by hardware processor 424. Based on the energy metrics, or a statistical averaging thereof, an estimate of noise can be generated for the PRACH. As one example, the set of unused signal dimensions can comprise one or more unused cyclic shifts of a root sequence. If analyzed by hardware processor 424, energy metrics associated with these unused cyclic shifts can be averaged to estimate the noise for the PRACH. If analyzed by software processing module 426, a highest energy metric for the root sequence output by hardware processor 424 can be employed for the estimate of the noise, instead.

The aforementioned systems or apparatuses have been described with respect to interaction between several components, modules and/or communication interfaces. It should be appreciated that such systems and components/modules/interfaces can include those components/modules or sub-modules specified therein, some of the specified components/modules or sub-modules, and/or additional modules. For example, a wireless communication system could include base station 102 coupled with noise estimation apparatus 200, or a different combination of these or other entities. Sub-modules could also be implemented as modules communicatively coupled to other modules rather than included within parent modules. Additionally, it should be noted that one or more modules could be combined into a single module providing aggregate functionality. For instance, reference module 112 can include calculation module 116, or vice versa, to facilitate identifying unused signal dimensions and employing those dimensions for channel noise estimates, by way of a single component. The components can also interact with one or more other components not specifically described herein but known by those of skill in the art.

Furthermore, as will be appreciated, various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, and in addition to that already described herein, can automate certain mechanisms or processes performed thereby to make portions of the systems and methods more adaptive as well as efficient and intelligent.

Figure 5:
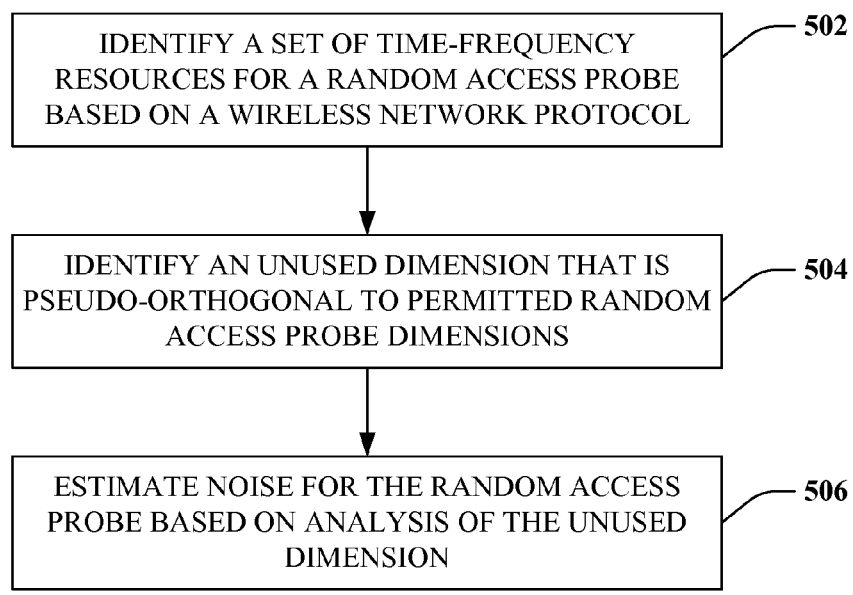
FIG. 5 illustrates a flowchart of an example methodology for providing improved noise estimation in wireless communication according to other aspects.
Figure 6:
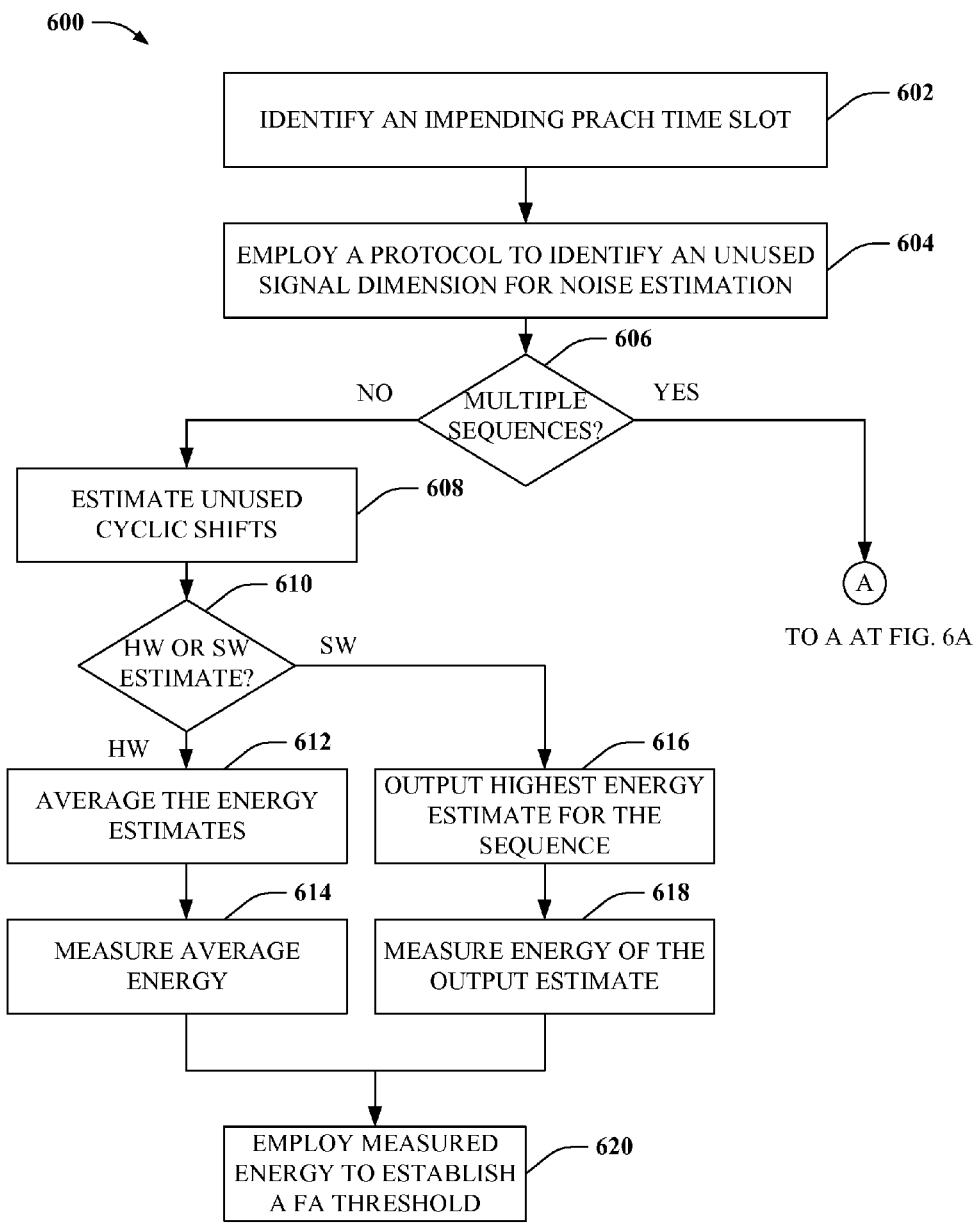
FIGS. 6 and 6A illustrate a flowchart of a sample methodology for employing unused signal dimensions for PRACH noise estimation.
Figure 6A:
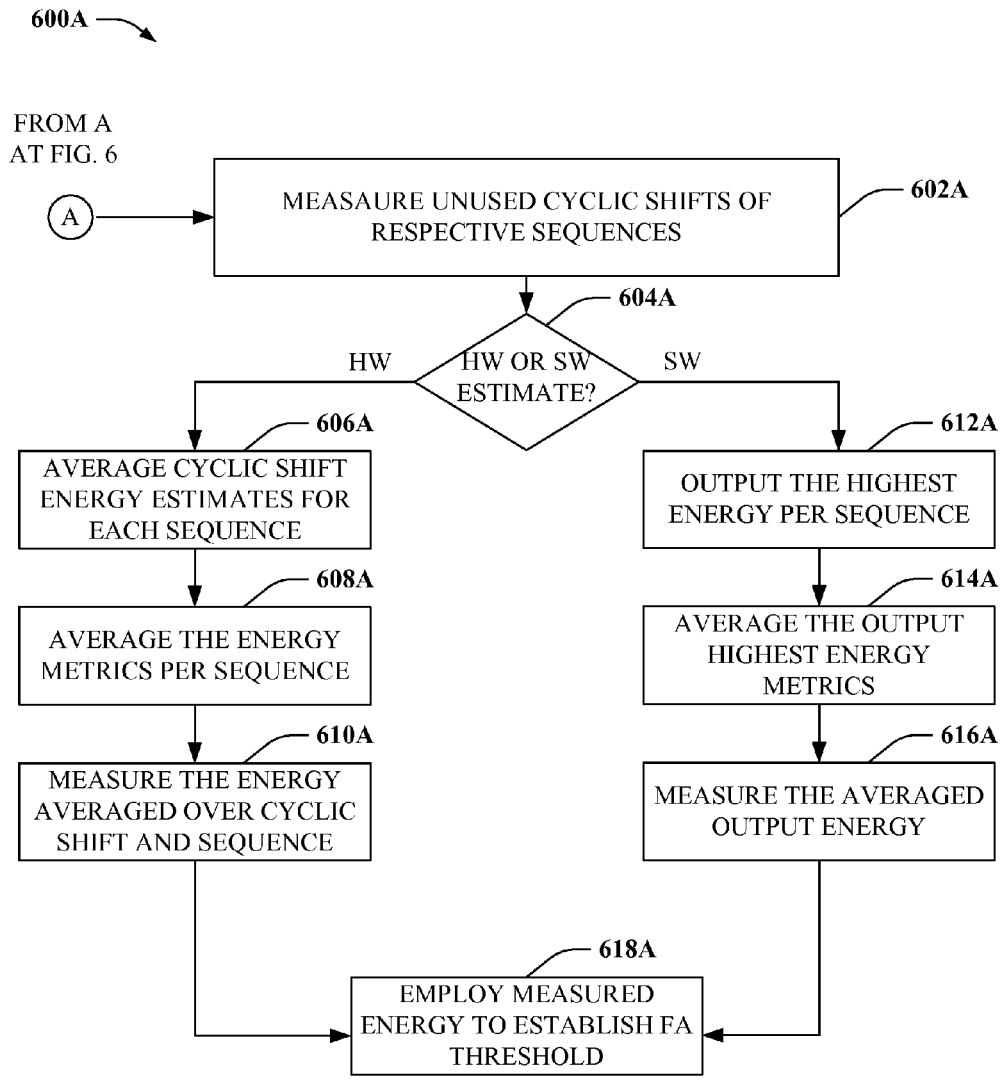

In view of the exemplary systems described supra, methodologies that may be implemented in accordance with the disclosed subject matter will be better appreciated with reference to the flow charts of FIGS. 5-6A. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed hereinafter and throughout this specification are capable of being stored on an article of manufacture to facilitate transporting and transferring such methodologies to computers. The term article of manufacture, as used, is intended to encompass a computer program accessible from any computer-readable device, device in conjunction with a carrier, or storage medium.

FIG. 5 illustrates a flowchart of an example methodology 500 according to one or more aspects of the subject disclosure. At 502, method 500 can comprise identifying a set of time-frequency resources for a random access probe according to a wireless network protocol. At 504, method 500 can comprise identifying at least one unused dimension that is orthogonal or pseudo-orthogonal to permitted random access probe dimensions of the wireless network. At 506, method 500 can further comprise estimating noise for the random access probe based on analysis of the unused dimension.

According to specific aspects of the subject disclosure, identifying the at least one unused dimension can further comprise employing an unused cyclic shift of a root sequence (e.g., a sequence providing pseudo-orthogonality for the random access probe) for the unused dimension, wherein the root sequence provides a set of permitted random access probe dimensions. In one option of this aspect, identifying the at least one unused dimension can further comprise employing a set of unused cyclic shifts of the root sequence for the unused dimension.

As an alternative to the foregoing, identifying the at least one unused dimension can further comprise employing an unused sequence of a root sequence for the unused dimension. According to this latter aspect, method 500 can additionally comprise implementing the unused sequence in a hardware signal processor for estimating the noise. Furthermore, according to a sub-aspect, method 500 can comprise deriving energy metrics per shift within the unused sequence and performing an average of the energy metrics, wherein an estimate of noise is obtained from the average of the energy metrics. As an alternative to this sub-aspect, method 500 can instead comprise implementing the unused sequence in a software signal processing algorithm for estimating the noise. For this alternative, method 500 can optionally comprise deriving a set of energy metrics from a set of unused sequences that are employed for the unused dimension, wherein estimating the noise further comprises averaging the set of energy metrics. In one other aspect of the subject disclosure, method 500 can comprise employing an unused root sequence for the unused dimension. In this other aspect, method 500 can additionally comprise deriving a set of energy metrics per cyclic shift of the unused root sequence and averaging the set of energy metrics for estimating the noise.

As described, method 500 can provide substantial benefit for noise estimation in a wireless network. For instance, employing unused signal dimensions can alleviate a need to separate actual signal transmissions of a transmitting device from noise on an access channel. Furthermore, various aspects provide estimation of noise in receiver hardware for high accuracy estimation over a plurality of signal dimensions, or an estimation of noise in software to provide noise estimation with minimal cost or update time to conventional wireless receivers.

FIGS. 6 and 6A depict a flowchart of a sample methodology 600 according to additional aspects of the subject disclosure, where sample methodology 600A refers to a portion of sample methodology 600. At 602, method 600 can comprise identifying an impending PRACH time slot for a wireless network. At 604, method 600 can comprise employing a protocol of the wireless network to identify an unused signal dimension for noise estimation for the impending PRACH time slot. At 606, method 600 can comprise making a determination as to whether multiple sequences or a single sequence is employed to generate the unused signal dimension. If multiple sequences are employed, method 600 can proceed to FIG. 6A at 602A. Otherwise, method 600 can proceed to 608.

At 608, method 600 can comprise estimating energy metrics of a set of unused cyclic shifts of a single sequence employed for the unused signal dimension. At 610, method 600 can comprise determining whether an estimate of noise on the unused cyclic shifts is performed in a hardware module or a software module. For hardware estimation, method 600 can proceed to 612; otherwise, method 600 proceeds to 616.

At 612, method 600 can comprise averaging energy metrics of the set of unused cyclic shifts. At 614, method 600 can comprise measuring an energy level of the average energy metric. From 614, method 600 can proceed to 620, where method 600 can employ the measured energy level to establish a FA threshold for the PRACH.

At 616, method 600 can comprise outputting a highest energy estimate for the sequence. At 618, method 600 can comprise measuring an energy level of the output highest energy estimate. From 618, method 600 can proceed to 620, where the measured energy level is employed to establish the FA threshold for the PRACH.

Referring now to FIG. 6A, method 600 can comprise measuring energy levels of cyclic shifts of respective sequences of multiple sequences employed for the unused signal dimensions, at 602A. At 604A, method 600 can comprise determining whether an estimate of noise is implemented in the hardware module or the software module. For the hardware module, method 600 can proceed to 606A; otherwise method 600 proceeds to 612A.

At 606A, method 600 can comprise averaging cyclic shift energy estimates per cyclic shift and of respective sequences of the multiple sequences. At 608A, method 600 can comprise averaging the energy metrics across the multiple sequences. Additionally, at 610A, method 600 can comprise measuring the energy metric averaged over cyclic shift and over the respective sequences. From 610A, method 600 can proceed to 618A, where measured energy is employed for establishing the FA threshold for the PRACH.

At 612A, method 600 can comprise outputting a highest energy metric per sequence among respective energy metrics of cyclic shifts of each sequence. Furthermore, at 614A, method 600 can comprise averaging the output highest energy metrics among the respective sequences. At 616A, method 600 can comprise measuring the averaged output highest energy metrics and, at 618A, method 600 can comprise employing the measured energy to establish the FA threshold for the PRACH.

Figure 7:
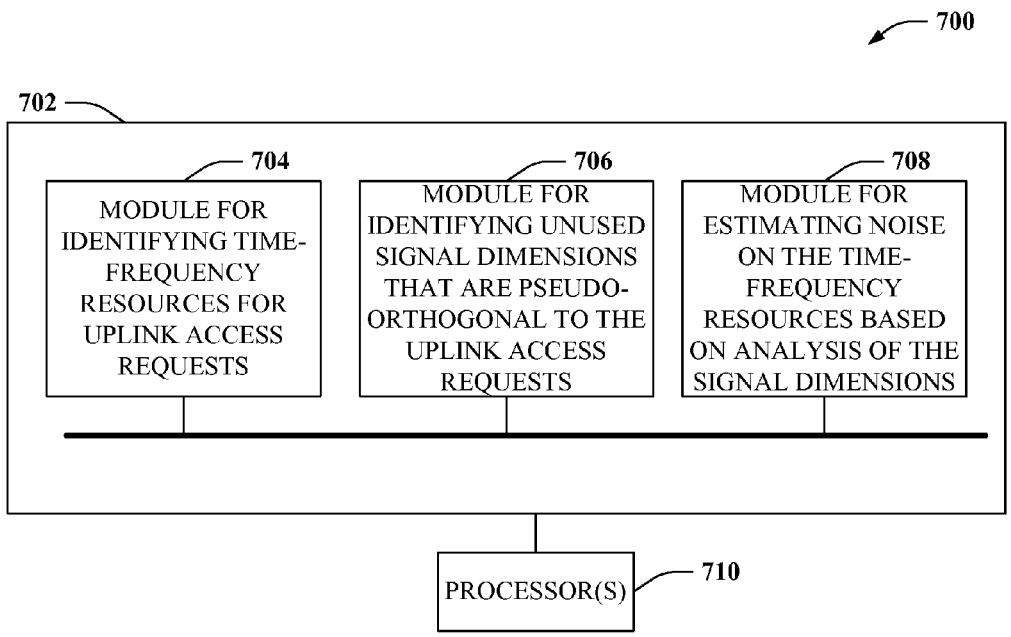
FIG. 7 illustrates a block diagram of a sample apparatus that provides noise estimation according to still other aspects of the subject disclosure.

FIG. 7 illustrates an example apparatus 700 for implementing access channel noise estimation in wireless communications according to aspects of the subject disclosure. For instance, apparatus 700 can reside at least partially within a wireless communication network and/or within a wireless receiver such as a node, base station, access point, user terminal, personal computer coupled with a mobile interface card, or the like. It is to be appreciated that apparatus 700 is represented as including functional blocks, which can be functional blocks that represent functions implemented by a processor, software, or combination thereof (e.g., firmware).

Apparatus 700 can comprise memory 702 for storing modules or instructions configured to provide functions of apparatus 700, and a data processor 710 to execute modules that implement those functions. Particularly, apparatus 700 can comprise a module 704 for identifying time-frequency resources provided for uplink random access requests according to a wireless network protocol. Further, apparatus 700 can additionally comprise a module 706 for identifying signal dimensions that are orthogonal or pseudo-orthogonal to permitted random access dimensions on the time-frequency resources, and that are not assigned for uplink transmission on the time-frequency resources in a geographic region served by the apparatus. Moreover, apparatus 700 can also comprise a module 708 for estimating noise on the time-frequency resources based on analysis of the signal dimensions.

Figure 8:
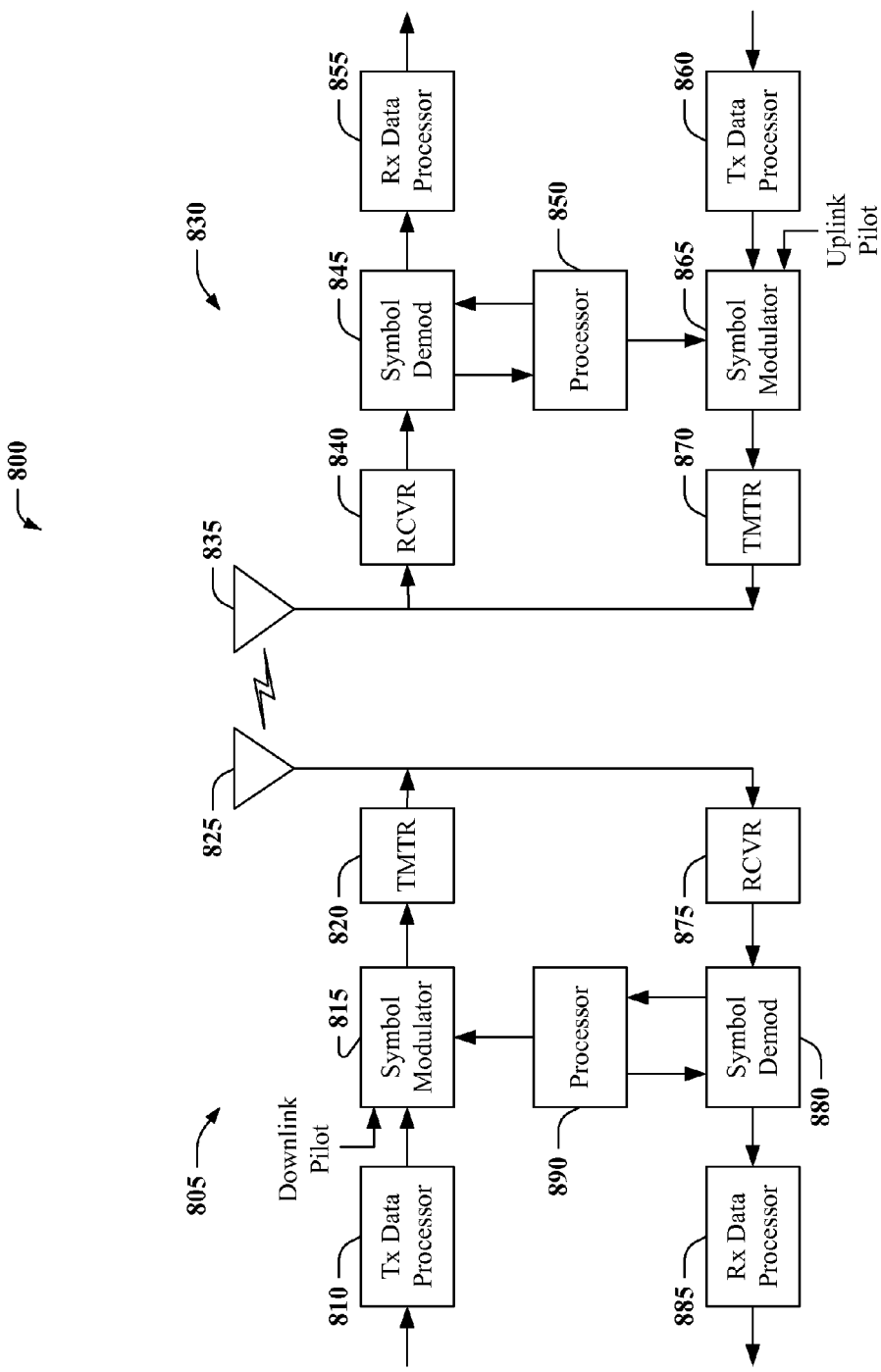
FIG. 8 illustrates a block diagram of a sample wireless communications apparatus that can be employed to implement various aspects of the subject disclosure.

FIG. 8 depicts a block diagram of an example system 800 that can facilitate wireless communication according to some aspects disclosed herein. On a DL, at access point 805, a transmit (TX) data processor 810 receives, formats, codes, interleaves, and modulates (or symbol maps) traffic data and provides modulation symbols ("data symbols"). A symbol modulator 815 receives and processes the data symbols and pilot symbols and provides a stream of symbols. A symbol modulator 815 multiplexes data and pilot symbols and provides them to a transmitter unit (TMTR) 820. Each transmit symbol can be a data symbol, a pilot symbol, or a signal value of zero. The pilot symbols can be sent continuously in each symbol period. The pilot symbols can be frequency division multiplexed (FDM), orthogonal frequency division multiplexed (OFDM), time division multiplexed (TDM), code division multiplexed (CDM), or a suitable combination thereof or of like modulation and/or transmission techniques.

TMTR 820 receives and converts the stream of symbols into one or more analog signals and further conditions (e.g., amplifies, filters, and frequency upconverts) the analog signals to generate a DL signal suitable for transmission over the wireless channel. The DL signal is then transmitted through an antenna 825 to the terminals. At terminal 830, an antenna 835 receives the DL signal and provides a received signal to a receiver unit (RCVR) 840. Receiver unit 840 conditions (e.g., filters, amplifies, and frequency downconverts) the received signal and digitizes the conditioned signal to obtain samples. A symbol demodulator 845 demodulates and provides received pilot symbols to a processor 850 for channel estimation. Symbol demodulator 845 further receives a frequency response estimate for the DL from processor 850, performs data demodulation on the received data symbols to obtain data symbol estimates (which are estimates of the transmitted data symbols), and provides the data symbol estimates to an RX data processor 855, which demodulates (e.g., symbol demaps), deinterleaves, and decodes the data symbol estimates to recover the transmitted traffic data. The processing by symbol demodulator 845 and RX data processor 855 is complementary to the processing by symbol modulator 815 and TX data processor 810, respectively, at access point 805.

On the UL, a TX data processor 860 processes traffic data and provides data symbols. A symbol modulator 865 receives and multiplexes the data symbols with pilot symbols, performs modulation, and provides a stream of symbols. A transmitter unit 870 then receives and processes the stream of symbols to generate an UL signal, which is transmitted by the antenna 835 to the access point 805. Specifically, the UL signal can be in accordance with SC-FDMA requirements and can include frequency hopping mechanisms as described herein.

At access point 805, the UL signal from terminal 830 is received by the antenna 825 and processed by a receiver unit 875 to obtain samples. A symbol demodulator 880 then processes the samples and provides received pilot symbols and data symbol estimates for the UL. An RX data processor 885 processes the data symbol estimates to recover the traffic data transmitted by terminal 830. A processor 890 performs channel estimation for each active terminal transmitting on the UL. Multiple terminals can transmit pilot concurrently on the UL on their respective assigned sets of pilot sub-bands, where the pilot sub-band sets can be interlaced.

Processors 890 and 850 direct (e.g., control, coordinate, manage, etc.) operation at access point 805 and terminal 830, respectively. Respective processors 890 and 850 can be associated with memory units (not shown) that store program codes and data. Processors 890 and 850 can also perform computations to derive frequency and time-based impulse response estimates for the UL and DL, respectively.

For a multiple-access system (e.g., SC-FDMA, FDMA, OFDMA, CDMA, TDMA, etc.), multiple terminals can transmit concurrently on the UL. For such a system, the pilot sub-bands can be shared among different terminals. The channel estimation techniques can be used in cases where the pilot sub-bands for each terminal span the entire operating band (possibly except for the band edges). Such a pilot sub-band structure would be desirable to obtain frequency diversity for each terminal.

The techniques described herein can be implemented by various means. For example, these techniques can be implemented in hardware, software, or a combination thereof. For a hardware implementation, which can be digital, analog, or both digital and analog, the processing units used for channel estimation can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes can be stored in memory unit and executed by the processors 890 and 850.

Figure 9:
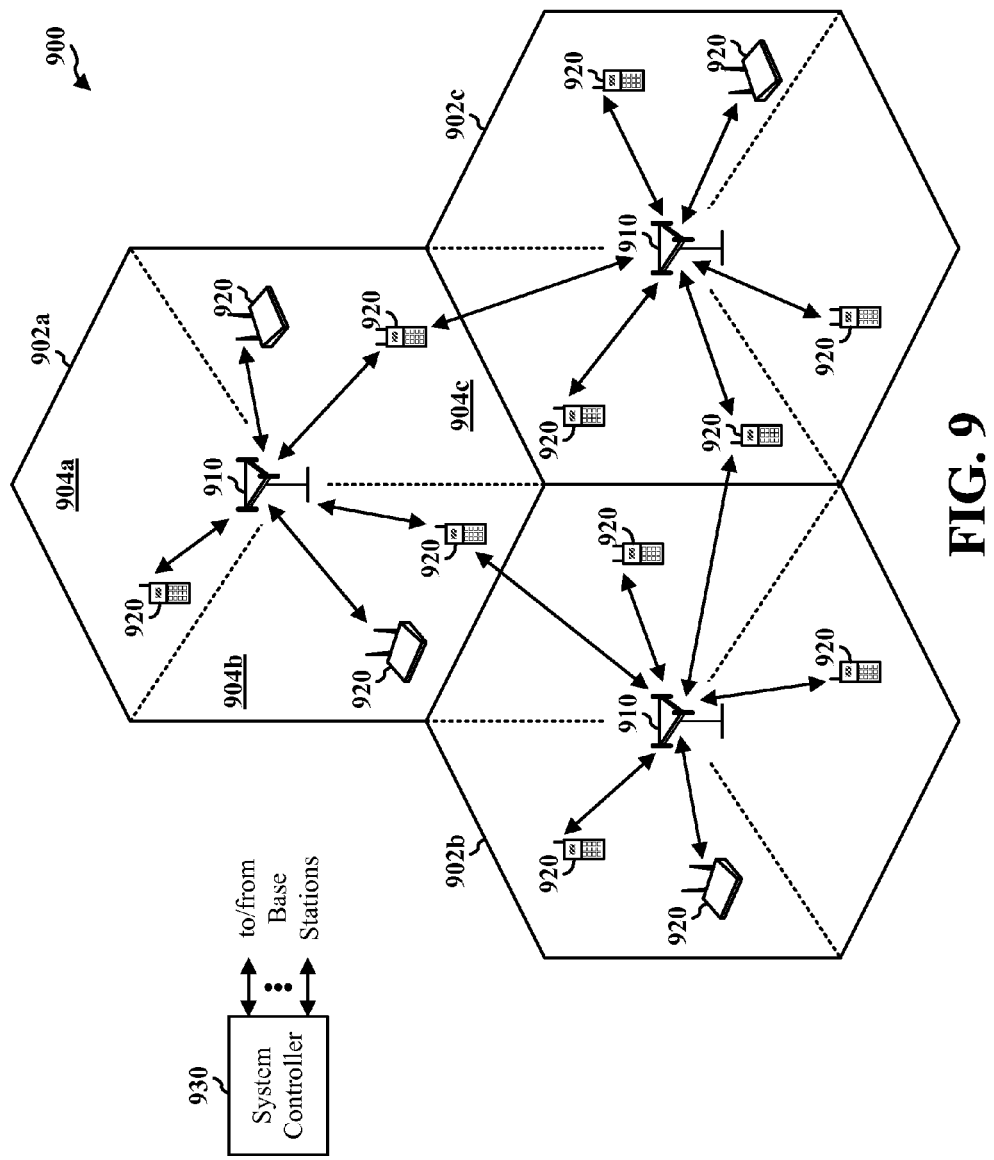
FIG. 9 illustrates a block diagram of a sample cellular environment for wireless communications according to further aspects.

FIG. 9 illustrates a wireless communication system 900 with multiple base stations 910 (e.g., wireless access points, wireless communication apparatus) and multiple terminals 920 (e.g., ATs), such as can be utilized in conjunction with one or more aspects. A base station 910 is generally a fixed station that communicates with the terminals and can also be called an access point, a Node B, or some other terminology. Each base station 910 provides communication coverage for a particular geographic area or coverage area, illustrated as three geographic areas in FIG. 9, labeled 902*a*, 902*b*, and 902*c*. The term "cell" can refer to a base station or its coverage area depending on the context in which the term is used. To improve system capacity, a BS geographic area/coverage area can be partitioned into multiple smaller areas (e.g., three smaller areas, according to cell 902*a* in FIG. 9), 904*a*, 904*b*, and 904*c*. Each smaller area (904*a*, 904*b*, 904*c*) can be served by a respective base transceiver subsystem (BTS). The term "sector" can refer to a BTS or its coverage area depending on the context in which the term is used. For a sectorized cell, the BTSs for all sectors of that cell are typically co-located within the base station for the cell. The transmission techniques described herein can be used for a system with sectorized cells as well as a system with un-sectorized cells. For simplicity, in the subject description, unless specified otherwise, the term "base station" is used generically for a fixed station that serves a sector as well as a fixed station that serves a cell.

Terminals 920 are typically dispersed throughout the system, and each terminal 920 can be fixed or mobile. Terminals 920 can also be called a mobile station, user equipment, a user device, wireless communication apparatus, an access terminal, a user terminal or some other terminology. A terminal 920 can be a wireless device, a cellular phone, a personal digital assistant (PDA), a wireless modem card, and so on. Each terminal 920 can communicate with zero, one, or multiple base stations 910 on the downlink (e.g., FL) and uplink (e.g., RL) at any given moment. The downlink refers to the communication link from the base stations to the terminals, and the uplink refers to the communication link from the terminals to the base stations.

For a centralized architecture, a system controller 930 couples to base stations 910 and provides coordination and control for base stations 910. For a distributed architecture, base stations 910 can communicate with one another as needed (e.g., by way of a wired or wireless backhaul network communicatively coupling the base stations 910). Data transmission on the forward link often occurs from one access point to one access terminal at or near the maximum data rate that can be supported by the forward link or the communication system. Additional channels of the forward link (e.g., control channel) can be transmitted from multiple access points to one access terminal Reverse link data communication can occur from one access terminal to one or more access points.

Figure 10:
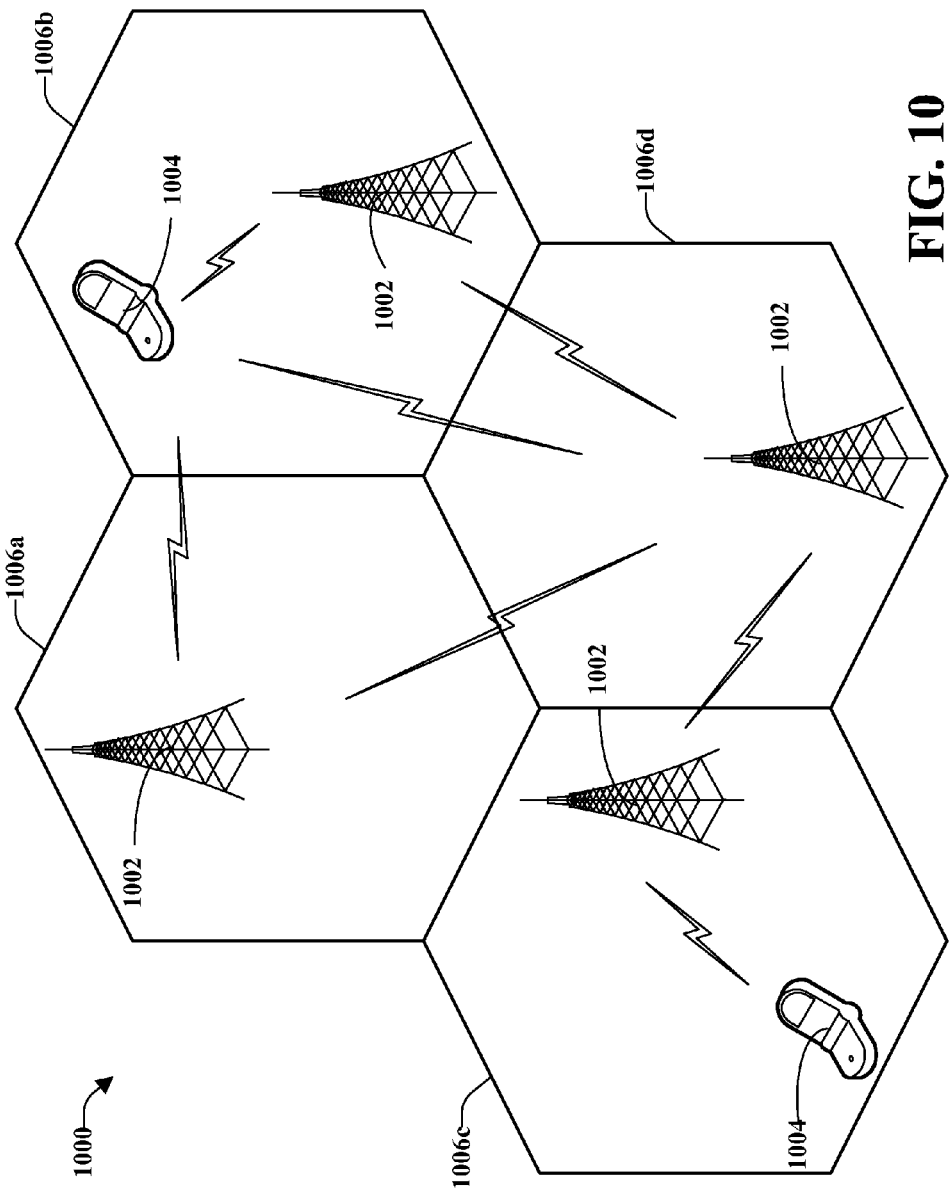
FIG. 10 illustrates a block diagram of an example cell-based wireless communication arrangement suitable for one or more disclosed aspects.

FIG. 10 is an illustration of a planned or semi-planned wireless communication environment 1000, in accordance with various aspects. Wireless communication environment 1000 can comprise one or more base stations 1002 in one or more cells and/or sectors that receive, transmit, repeat, etc., wireless communication signals to each other and/or to one or more mobile devices 1004. As illustrated, each base station 1002 can provide communication coverage for a particular geographic area, illustrated as four geographic areas, labeled 1006*a*, 1006*b*, 1006*c* and 1006*d*. Each base station 1002 can comprise a transmitter chain and a receiver chain, each of which can in turn comprise a plurality of components associated with signal transmission and reception (e.g., processors, modulators, multiplexers, demodulators, demultiplexers, antennas, and so forth, see FIG. 8, supra), as will be appreciated by one skilled in the art. Mobile devices 1004 can be, for example, cellular phones, smart phones, laptops, handheld communication devices, handheld computing devices, satellite radios, global positioning systems, PDAs, or any other suitable device for communicating over wireless communication environment 1000. Wireless communication environment 1000 can be employed in conjunction with various aspects described herein in order to facilitate multi-node relay assignment and cell-splitting effects in wireless communication, as set forth herein.

As used in the subject disclosure, the terms "component," "system," "module" and the like are intended to refer to a computer-related entity, either hardware, software, software in execution, firmware, middle ware, microcode, and/or any combination thereof. For example, a module can be, but is not limited to being, a process running on a processor, a processor, an object, an executable, a thread of execution, a program, a device, and/or a computer. One or more modules can reside within a process, or thread of execution; and a module can be localized on one electronic device, or distributed between two or more electronic devices. Further, these modules can execute from various computer-readable media having various data structures stored thereon. The modules can communicate by way of local or remote processes such as in accordance with a signal having one or more data packets (e.g., data from one component interacting with another component in a local system, distributed system, or across a network such as the Internet with other systems by way of the signal). Additionally, components or modules of systems described herein can be rearranged, or complemented by additional components/modules/systems in order to facilitate achieving the various aspects, goals, advantages, etc., described with regard thereto, and are not limited to the precise configurations set forth in a given figure, as will be appreciated by one skilled in the art.

Furthermore, various aspects are described herein in connection with a UE. A UE can also be called a system, a subscriber unit, a subscriber station, mobile station, mobile, mobile communication device, mobile device, remote station, remote terminal, AT, user agent (UA), a user device, or user terminal (UT). A subscriber station can be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem or similar mechanism facilitating wireless communication with a processing device.

In one or more exemplary embodiments, the functions described can be implemented in hardware, software, firmware, middleware, microcode, or any suitable combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media may be any physical media that can be accessed by a computer. By way of example, and not limitation, such computer storage media can comprise RAM, ROM, EEPROM, CD-ROM or other optical disk storage, magnetic disk storage or other magnetic storage devices, smart cards, and flash memory devices (e.g., card, stick, key drive . . . ), or any other medium that can be used to carry or store desired program code in the form of instructions or data structures and that can be accessed by a computer. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

For a hardware implementation, the processing units' various illustrative logics, logical blocks, modules, and circuits described in connection with the aspects disclosed herein can be implemented or performed within one or more ASICs, DSPs, DSPDs, PLDs, FPGAs, discrete gate or transistor logic, discrete hardware components, general purpose processors, controllers, micro-controllers, microprocessors, other electronic units designed to perform the functions described herein, or a combination thereof. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other suitable configuration. Additionally, at least one processor can comprise one or more modules operable to perform one or more of the steps and/or actions described herein.

Moreover, various aspects or features described herein can be implemented as a method, apparatus, or article of manufacture using standard programming and/or engineering techniques. Further, the steps and/or actions of a method or algorithm described in connection with the aspects disclosed herein can be embodied directly in hardware, in a software module executed by a processor, or in a combination of the two. Additionally, in some aspects, the steps or actions of a method or algorithm can reside as at least one or any combination or set of codes or instructions on a machine-readable medium, or computer-readable medium, which can be incorporated into a computer program product. The term "article of manufacture" as used herein is intended to encompass a computer program accessible from any suitable computer-readable device or media.

Additionally, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Furthermore, as used herein, the terms to "infer" or "inference" refer generally to the process of reasoning about or inferring states of the system, environment, or user from a set of observations as captured via events, or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events, or data. Such inference results in the construction of new events or actions from a set of observed events and/or stored event data, whether or not the events are correlated in close temporal proximity, and whether the events and data come from one or several event and data sources. What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" are used in either the detailed description or the claims, such terms are intended to be inclusive in a manner similar to the term "comprising" as "comprising" is interpreted when employed as a transitional word in a claim.

What is claimed is:

1. A method for wireless communication, comprising:
identifying a set of time-frequency resources for an uplink wireless signal according to a wireless network protocol;
identifying at least one unused dimension that is orthogonal or pseudo-orthogonal to permitted uplink wireless signal dimensions, the at least one unused dimension comprising a root sequence and each cyclic shift of the root sequence, the root sequence and each cyclic shift of the root sequence being unused; and
estimating noise for the uplink wireless signal based on analysis of at least one of the unused root sequence or the unused cyclic shift of the unused root sequence.

2. The method of claim 1, wherein the root sequence provides a set of permitted uplink wireless signal dimensions.

3. The method of claim 1, wherein the root sequence is a sequence providing pseudo-orthogonality for the uplink wireless signal.

4. The method of claim 1, wherein the at least one of the unused root sequence or the unused cyclic shift of the unused root sequence comprises the unused root sequence and each unused cyclic shift of the unused root sequence.

5. The method of claim 4, further comprising implementing the estimating of the noise in a hardware signal processor.

6. The method of claim 5, further comprising deriving energy metrics for the unused root sequence and per unused cyclic shift of the unused root sequence and performing an average of the energy metrics, wherein the noise is obtained from the average of the energy metrics.

7. The method of claim 4, further comprising implementing the estimating of the noise in a software signal processing algorithm.

8. The method of claim 7, further comprising deriving a set of energy metrics from a set of unused sequences of the at least one unused dimension, and wherein the estimating of the noise further comprises averaging the set of energy metrics.

9. The method of claim 1, further comprising deriving a set of energy metrics for the unused root sequence and per cyclic shift of the unused root sequence and averaging the set of energy metrics for the estimating of the noise.

10. The method of claim 1, wherein the uplink wireless signal is a random access probe.

11. An apparatus for wireless communication, comprising:
means for identifying time-frequency resources provided for an uplink wireless signal according to a wireless network protocol;
means for identifying signal dimensions that are orthogonal or pseudo-orthogonal to permitted uplink wireless signal dimensions on the time-frequency resources, and that are not assigned for uplink transmission on the time-frequency resources in a geographic region served by the apparatus, the signal dimensions comprising a root sequence and each cyclic shift of the root sequence; and
means for estimating noise on the time-frequency resources based on analysis of at least one of the root sequence or the cyclic shift of the root sequence.

12. The apparatus of claim 11, wherein the root sequence provides a set of permitted uplink wireless signal dimensions.

13. The apparatus of claim 11, wherein the root sequence is a sequence providing pseudo-orthogonality for the uplink wireless signal.

14. The apparatus of claim 11, wherein the at least one of the root sequence or the cyclic shift of the root sequence comprises the root sequence and each cyclic shift of the root sequence.

15. The apparatus of claim 11, wherein the uplink wireless signal comprises an uplink random access request.

16. The apparatus of claim 11, wherein the means for estimating the noise is implemented in a hardware signal processor.

17. The apparatus of claim 16, further comprising means for deriving energy metrics for the root sequence and per cyclic shift of the root sequence and performing an average of the energy metrics, wherein the noise is obtained from the average of the energy metrics.

18. An apparatus for wireless communication, comprising a processor configured to execute computer executable modules stored in memory, the modules including:
a first module that identifies time-frequency resources provided for an uplink wireless signal according to a wireless network protocol;
a second module that identifies signal dimensions that are orthogonal or pseudo-orthogonal to permitted uplink wireless signal dimensions on the time-frequency resources, and that are not assigned for uplink transmission on the time-frequency resources in a geographic region served by a base station, the signal dimensions comprising a root sequence and each cyclic shift of the root sequence; and
a third module that estimates noise on the time-frequency resources based on analysis of at least one of the root sequence or the cyclic shift of the root sequence.

19. The apparatus of claim 18, wherein the root sequence provides a set of permitted uplink wireless signal dimensions.

20. The apparatus of claim 18, wherein the root sequence is a sequence providing pseudo-orthogonality for the uplink wireless signal.

21. The apparatus of claim 18, wherein the at least one of the root sequence or the cyclic shift of the root sequence comprises the root sequence and each cyclic shift of the root sequence.

22. The apparatus of claim 18, wherein the uplink wireless signal comprises an uplink random access request.

23. The apparatus of claim 18, wherein the third module is implemented in a hardware signal processor.

24. The apparatus of claim 23, wherein the third module is configured to derive energy metrics for the root sequence and per cyclic shift of the root sequence and perform an average of the energy metrics, wherein the noise is obtained from the average of the energy metrics.

25. A
non-transitory computer-readable medium storing computer executable code for wireless communication, comprising:
a first set of codes for causing a computer to identify time-frequency resources provided for an uplink wireless signal according to a wireless network protocol;

a second set of codes for causing the computer to identify signal dimensions that are orthogonal or pseudo-orthogonal to permitted uplink wireless signal dimensions on the time-frequency resources, and that are not assigned for uplink transmission on the time-frequency resources in a geographic region served by a base station, the signal dimensions comprising a root sequence and each cyclic shift of the root sequence; and a third set of codes for causing the computer to estimate noise on the time-frequency resources based on analysis of at least one of the root sequence or the cyclic shift of the root sequence.

26. The non-transitory computer-readable medium of claim 25, wherein the root sequence provides a set of permitted uplink wireless signal dimensions.

27. The non-transitory computer-readable medium of claim 25, wherein the root sequence is a sequence providing pseudo-orthogonality for the uplink wireless signal.

28. The non-transitory computer-readable medium of claim 25, wherein the at least one of the root sequence or the cyclic shift of the root sequence comprises the root sequence and each cyclic shift of the root sequence.

29. The non-transitory computer-readable medium of claim 25, wherein the uplink wireless signal is an uplink random access request.

* * * * *